Sept. 3, 1957 L. B. McDANIEL 2,804,842
SELF CLEANING HENS' NEST AND EGG BASKET
Filed Aug. 27, 1953 2 Sheets-Sheet 1

L. B. McDaniel
INVENTOR

BY C. A. Snow & Co.
ATTORNEYS.

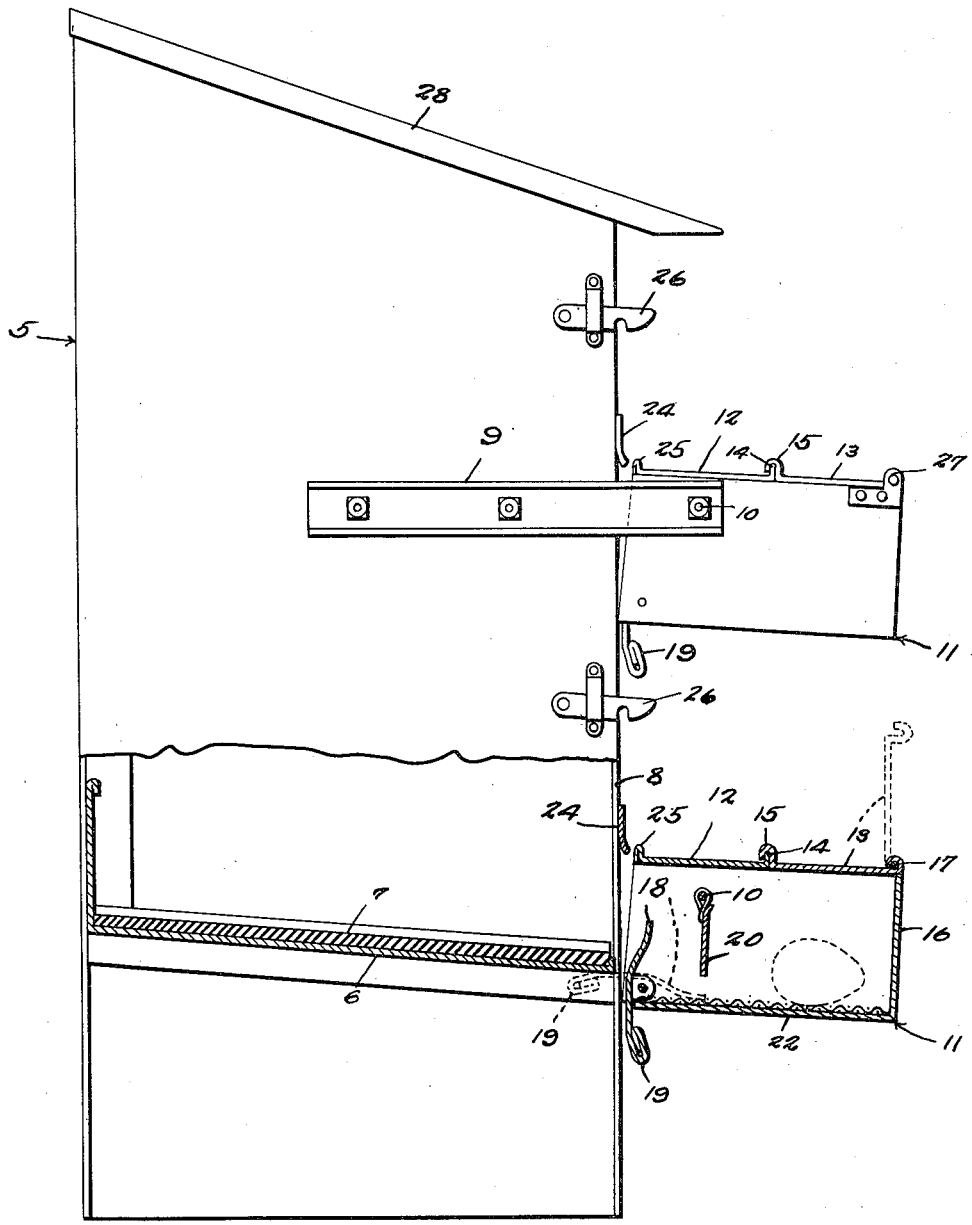

United States Patent Office 2,804,842
Patented Sept. 3, 1957

2,804,842

SELF CLEANING HENS' NEST AND EGG BASKET

Lewis B. McDaniel, Adelanto, Calif.

Application August 27, 1953, Serial No. 376,940

2 Claims. (Cl. 119—48)

This invention relates to hens' nests, the primary object of the invention being to provide a nest having means to protect the eggs laid in the nest against breakage, means being provided for delivering the eggs laid in the nest into an egg compartment or basket at the front of the nest, by gravity.

Another object of the invention is to provide a hens' nest having means for retarding the movement of the eggs from the nest proper into the egg receiving compartment, so that an egg will not strike the end of the compartment with such force as to break the same.

A still further object of the invention is to provide a hens' nest wherein the compartment into which the eggs roll from the main portion of the nest, may be swung upwardly to close the nest entrance and to prevent the nest from being used as a roost by the hens.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

Referring to the drawing:

Fig. 3 is a side elevational view of the nest, the lower portion thereof being broken away, illustrating the floor of the nest.

Figure 1:
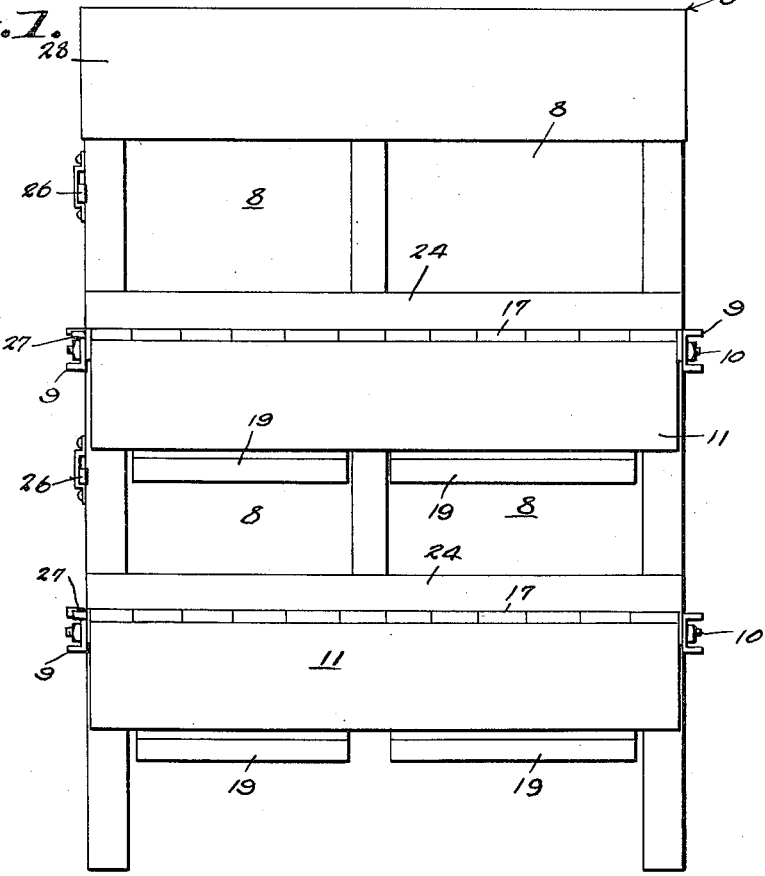
Figure 1 is a front elevational view of a hens' nest constructed in accordance with the invention.

Referring to the drawings in detail, the nest is indicated generally by the reference character 5, the nest being box-like in construction and provided with superposed floors 6, and although there may be two or more of such floors in a nest, only one of the floors will be described in detail, since they are identical. As shown, the floor 6 is lined with a rubber cushioning member 7, the upper surface of which is provided with spaced ribs extending transversely thereof, which ribs provide spaces into which droppings or other foreign matter may fall. The rubber cushioning member is fitted on the floor in such a manner that it may be readily and easily removed for cleaning purposes.

Openings 8 are formed in the front of the nest so that hens may have ready access to the interior of the nest for laying purposes.

Mounted on opposite sides of the nest are channel bars 9 which have their forward ends extended substantial distances beyond the front of the hens' nest, where they provide supports for the rod 10 on which the receiving compartment or egg basket 11 is pivotally mounted. This egg basket is box-like in construction and has an open end fitted against the lower portion of the opening 8 of the nest with which it is used so that communication between the nest and egg basket or compartment is provided.

The top of the egg basket is normally closed by means of the plate 12 and hinged closure 13, the plate 12 being formed integral with the sides of the egg basket 11.

One edge of the plate 12 is extended upwardly, providing a flange 14 over which the hooked flange 15 is positioned, the flanges 14 and 15 providing means for connecting the closure 13 with the plate 12, and since the edges of the closure 13 rest on the upper side edges of the basket 11, the closure 13 and plate 12 provide a platform onto which hens may walk into the nest.

The closure 13 is hingedly connected to the front end wall 16 of the basket by means of the hinge 17, so that by moving the hinge closure to the dotted line position, shown by Fig. 3 of the drawings, ready access may be had to the interior of the egg compartment or basket, to remove eggs deposited therein.

As shown by Fig. 3 of the drawings, the bottom 6 is inclined downwardly towards the front of the nest, to the end that eggs laid in the nest may gravitate into the egg compartment or basket 11. Disposed within the end of the egg basket or compartment, adjacent to the open end thereof, is the pivoted cushioning member 18 which extends vertically in the path of travel of eggs rolling from the cushioning member 7 or nest, into the egg compartment or basket. The cushioning member is of a length to extend a substantial distance below the egg compartment or basket, as shown by Fig. 3, the lower end of the cushioning member being weighted at 19 to normally hold the cushioning member in an upright position. Also mounted within the egg compartment or basket 11, is the pivoted egg check 20 which depends from the rod 10 that extends across the egg compartment or basket in spaced relation with the upper end of the cushioning member 18, to further retard or check the movement of the egg into the egg compartment or basket 11 and to prevent an egg from rolling into the egg compartment or basket with such force as to break the eggs therein.

A screening member 22 lines the floor of the egg compartment or basket 11, so that the eggs will be maintained clean at all times.

Figure 2:
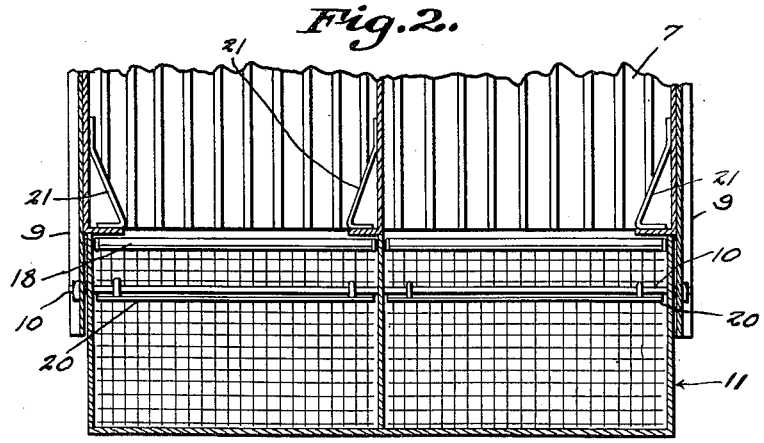
Fig. 2 is a fragmental sectional view through the nest.

The reference character 21 indicates baffles that are horizontally disposed and arranged within the open front end of the nest, which baffles are inclined, as clearly shown by Fig. 2 of the drawings to divert the eggs away from sharp corners or edges of the nest to prevent breakage of the eggs.

Extending across the front of the egg nest and overlying the inner edge of the egg compartment or basket 11, is the flexible dust protector 24, which cooperates with the transverse lug 25 in providing a dust-proof joint between the egg compartment or basket and the nest.

The egg compartment or basket may be swung upwardly and inwardly where the latch 26 is adapted to rest on the extended end of the pivot 27 on which the closure 13 is mounted, holding the compartment or egg basket in an upright position, closing the front of the nest to prevent hens or chickens from roosting in the nest.

From the foregoing it will be noted that it will be an easy matter to collect the eggs, which is done by merely elevating the hinged closure 13 to the dotted line position, as shown by Fig. 3 of the drawings, whereupon access to the egg compartment or egg basket may be readily had.

It might be further stated that the front lower edge of the roof 28 of the nest, extends a substantial distance beyond the front wall of the mounting of the nest, to thereby protect the open sides of the nest against the elements.

Having thus described the invention, what is claimed is:

1. In a nest, a box-like body having an entrance opening in the front wall thereof, a floor in said body inclined towards the entrance opening with its forward end terminating at the bottom of said entrance opening, horizontally disposed supporting bars secured to opposite sides of said box-like body, with the forward ends thereof extending substantially beyond the front of said body, an egg basket having an open inner end pivotally connected to the forward ends of said supporting bars at a point intermediate the sides of said basket, the open end of said basket confronting the lower portion of said entrance opening into which eggs roll from said body, said egg basket projecting a substantial distance beyond the front wall of said body, the top of said egg basket being spaced downwardly from the upper edge of said entrance opening and providing a platform for laying hens passing into said nest, said egg basket adapted to swing upwardly for closing the upper portion of said entrance opening of said body and means releasably latching said basket in entrance closing position.

2. In a nest as set forth in claim 1 including a cushioning member lining the floor of the body, a screening member lining the floor of the egg basket, a pivoted cushioning member mounted intermediate its ends, one end of said cushioning member being disposed within said basket end in the path of travel of eggs from said body into the egg basket for retarding movement of said eggs into said basket, the other end of said cushioning member being weighted and extended below the bottom of said basket, normally holding said cushioning member in a vertical egg restraining position.

References Cited in the file of this patent

UNITED STATES PATENTS

| | | |
|---|---|---|
| 556,527 | Berres | Mar. 17, 1896 |
| 1,035,871 | Gardner | Aug. 20, 1912 |
| 1,402,790 | Olson | Jan. 10, 1922 |
| 1,431,278 | Backlind | Oct. 10, 1922 |
| 1,926,133 | Anderson | Sept. 12, 1933 |
| 2,122,349 | Miles | June 28, 1938 |
| 2,264,156 | Apple | Nov. 25, 1941 |
| 2,279,147 | Stimson | Apr. 7, 1942 |
| 2,564,207 | Marshall | Aug. 14, 1951 |

FOREIGN PATENTS

| | | |
|---|---|---|
| 395,769 | Great Britain | July 27, 1933 |